E. J. Farkas
R. F. Weeks
INVENTORS

BY E. C. McRae
R. G. Harris
J. R. Faulkner
ATTORNEYS

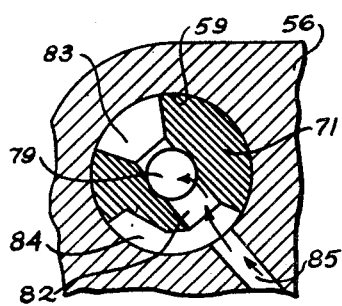
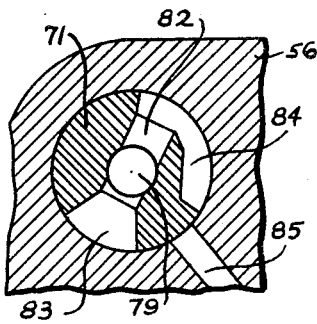
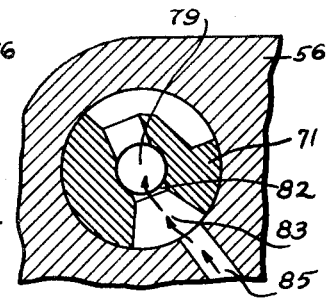
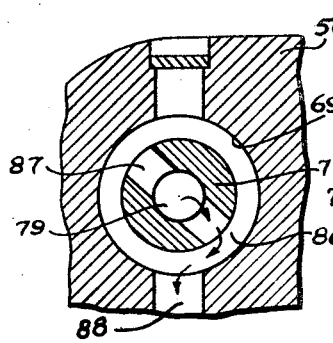
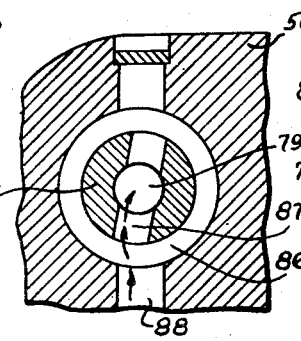
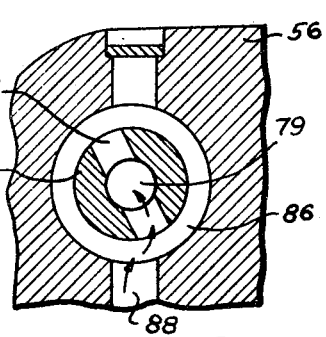
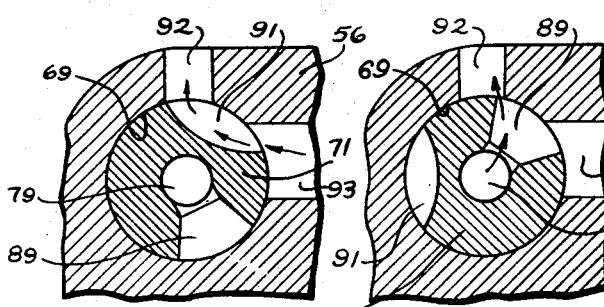
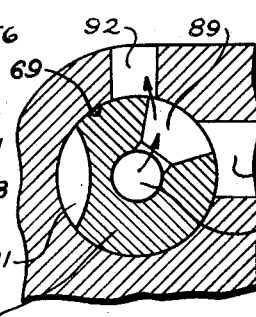
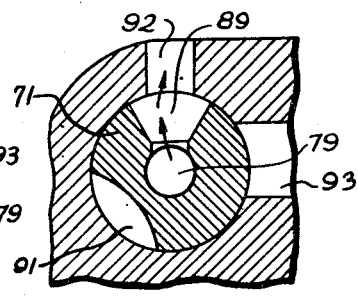

Patented Jan. 2, 1951

2,536,861

UNITED STATES PATENT OFFICE 2,536,861

CONTROL FOR AUTOMATIC TRANSMISSIONS

Roy F. Weeks, Dearborn, and Eugene J. Farkas, Detroit, Mich., assignors to Ford Motor Company, Dearborn, Mich., a corporation of Delaware Application October 27, 1945, Serial No. 625,028

9 Claims. (Cl. 74—472)

This invention relates generally to a transmission; and, more particularly, to a manually operated rotary acceleration control for an automatic transmission by means of which a transition to a lower speed ratio can be made to obtain greater acceleration.

The present invention comprises an improvement of the automatic transmission disclosed in the copending application of Eugene J. Farkas, Serial No. 611,975, filed August 22, 1945, now Patent #2,528,584 November 7, 1950. The transmission of the said copending application includes a multiple planetary gearing system adapted to transmit torque at three different speed ratios, with the transition from first to second speed, and from second to third speed, taking place automatically by the operation of second and third speed clutches which are activated by fluid under pressure applied by a fluid pump and regulated by governor controlled hydraulic valve means. In that construction, an accelerating valve was provided adjacent the fluid pump and arranged to control the flow of fluid from the pressure side of the pump to the third speed clutch. The reciprocable plunger of the valve was suitably linked to the vehicle accelerator pedal for operation thereby, and during normal accelerator travel permitted a flow of fluid to the third speed clutch. When additional acceleration was desired, requiring the use of the second speed gear ratio, the accelerator pedal was completely depressed, causing the accelerating valve to interrupt the flow of fluid to the third speed clutch.

Reference is also made to the application of Eugene J. Farkas and Joseph W. Rackle, Serial No. 625,029, filed October 27, 1945, in which a reciprocating plunger type valve was provided enabling the transmission to be shifted, not only from third to second speed, but also from second to first speed in the event additional acceleration was desired necessitating the use of the first speed ratio.

The present invention incorporates an improved accelerating valve of the rotary type, which is externally operable to change the transmission speed ratio from third to second speed, and also from second to first speed when additional acceleration is needed. The selective reduction of speed ratio can be effected either by depression of the accelerator pedal beyond its normal operating travel or by manual operation of a suitable control. The rotary valve accomplishes the above-mentioned results with a minimum of operating parts and provides a compact and efficient mechanism.

The rotary acceleration valve of the present invention is progressively angularly movable between three operating ranges. In the first range, the rotary valve permits fluid communication between the pump and the fluid activated clutches of the transmission, and the transmission is automatically shifted between the various speed ratios in accordance with normal speed requirements. In the second operating range of the rotary valve, the flow of fluid under pressure to the third speed clutch is interrupted and at the same time the valve opens communication between the clutch and the interior of the transmission casing to exhaust the fluid within the various clutch connected elements and to effect a shift from third to second speed to obtain additional acceleration when desired. In the third operating range of the rotary valve, communication is established between the pressure side of the pump and an exhaust port to deplete the pressure supplied to the second and third speed clutches and to effect a shift from second to first speed ratio to obtain the required acceleration.

Other objects and advantages of the present invention will be made more apparent as this description proceeds, particularly when considered in connection with the accompanying drawings, in which.

Figure 4:
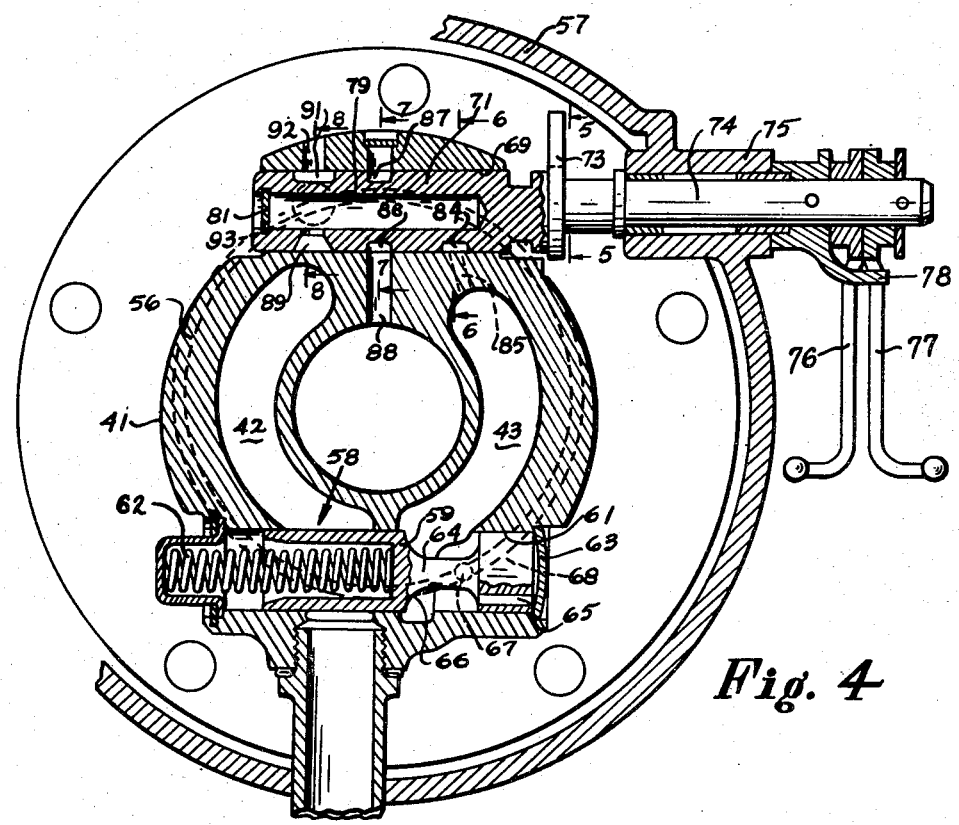
Figure 4 is a transverse sectional view through the fluid pump and rotary accelerating valve.

Figures 6, 7 and 8 are transverse sectional views taken substantially on the lines 6—6, 7—7, and 8—8 of Figure 4, illustrating the position of the rotary valve at engine idling speed.

Figures 9, 10 and 11 are transverse sectional views similar to Figures 6, 7 and 8, respectively, but illustrating the rotary valve in an angular position effective to shift the transmission from third to second speed.

Figures 12, 13 and 14 are transverse sectional views similar to Figures 9, 10, and 11, respectively, but illustrating the rotary valve in still another angular position in which the valve is effective to cause a transition from second to first speed.

Figure 15:
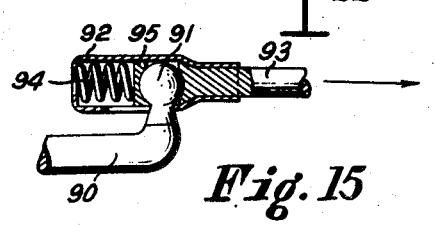

Figure 15 is a fragmentary cross sectional view of a coupling in the accelerator linkage.

It will be noted that the general construction of the transmission is shown schematically in the drawing, reference being made to the copending application, Serial No. 611,975, filed August 22, 1945, for a more detailed illustration of the mechanism.

Figure 1:
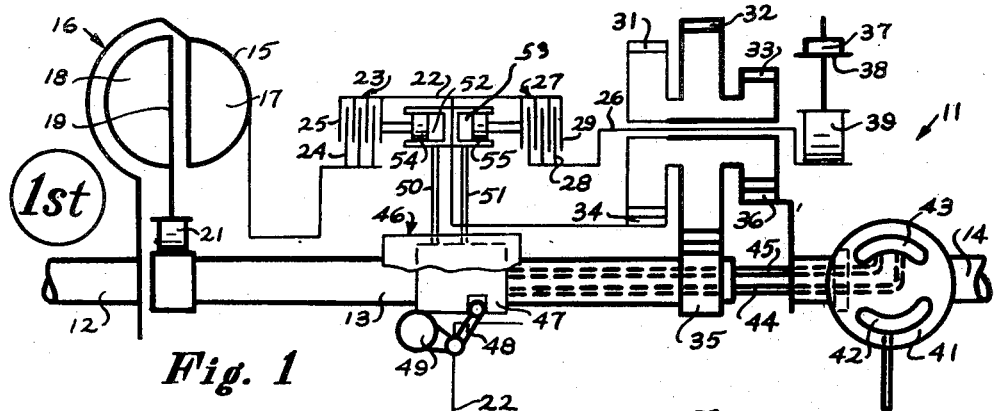
Figures 1, 2 and 3 are longitudinal vertical schematic drawings of the transmission, illustrating the power flow through the transmission in first, second and third speed ratios, respectively.
Figure 2:
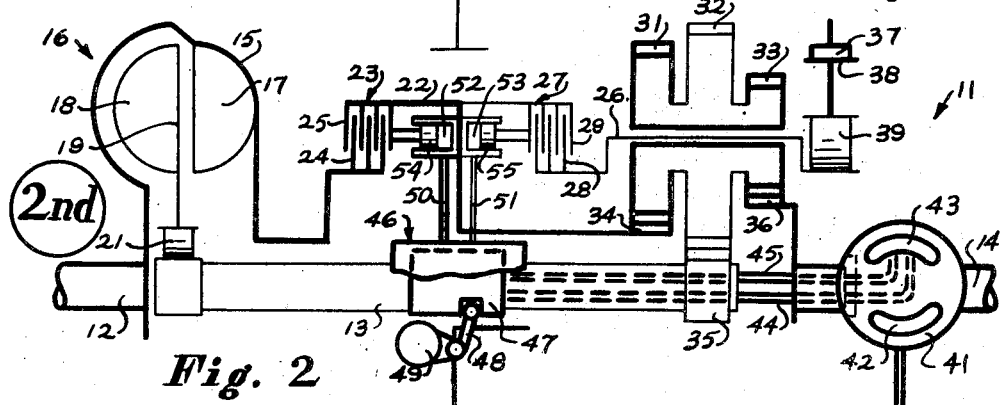
Figure 3:
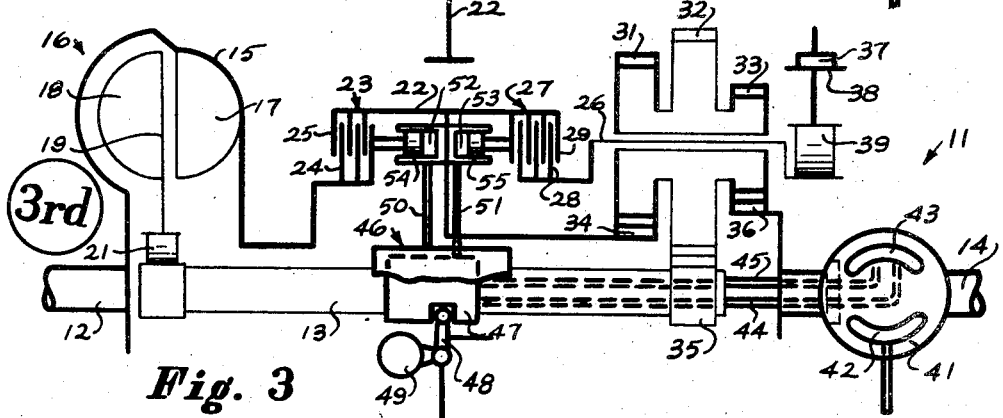

Referring now to the drawings and, more particularly, to Figures 1, 2 and 3, the reference character 11 indicates generally an automatic transmission having a drive shaft 12 connected to the crankshaft of the engine, a main shaft 13, and a load shaft 14 adapted to be connected to the rear axle drive means. Attached to the drive shaft 12 is the impeller housing 15 of a fluid coupling 16. The impeller housing has a series of vanes 17 co-operating in the usual manner with the vanes 18 in the runner housing 19. The runner housing 19 is connected to the main shaft 13 by an overrunning clutch 21.

The impeller housing 15 is adapted to be operatively connected to a clutch carrier 22 by means of a second speed clutch 23, the latter including clutch discs 24 and 25 operatively connected to the impeller housing 15 and the clutch carrier 22, respectively. The clutch carrier 22 is also adapted to be locked to the planet carrier 26 by means of a third speed clutch 27, the latter including clutch discs 28 and 29 operatively connected to the planet carrier 26 and the clutch carrier 22, respectively. The second and third speed clutches are adapted to be actuated automatically by hydraulic mechanism to be described later.

The planet carrier 26 is mounted for rotation about the axis of the main shaft 13, and carries clusters of planet pinions 31, 32 and 33. Planet pinion 32 is adapted to mesh with a sun gear 35 mounted on the main shaft 13, and planet pinion 33 with sun gear 36, the latter being carried by the load shaft 14.

Reverse rotation of the planet carrier 26 can be selectively prevented by means of the forward speed brake 37, which functions to lock the brake drum 38 to the transmission housing. Connection from the brake drum 38 to the planet carrier 26 is made through an overrunning clutch 39.

Fluid pressure for operating the second and third speed clutches is provided by a fluid pump 41 driven by the load shaft 14. Fluid is supplied to the intake chamber 42 of the pump 41 and is delivered under pressure by the pump to the pressure chamber 43.

As diagrammatically shown in Figure 1, fluid under pressure from the pressure chamber 43 of the pump is transmitted through conduits 44 and 45 to the valve 46. The sleeve 47 of the valve is adapted to be reciprocated by the bell crank 48 pivotally mounted on the clutch carrier 22. The bell crank 48 carries centrifugal weights 49 which are moved outwardly by centrifugal force as the clutch carrier is rotated. Under certain conditions of speed the conduits 44 and 45 are adapted to be connected by the valve 46 to the conduits 50 and 51, respectively, which communicate with cylinders 52 and 53 formed in the clutch carrier 22. Mounted within the cylinders 52 and 53 are pistons 54 and 55, respectively.

When actuated by fluid pressure, the second speed piston 54 is adapted to force the clutch discs 24 and 25 of the second speed clutch into frictional engagement with each other, and to thus lock the impeller housing 15 to the clutch carrier 22. In like manner, the third speed piston 55 is adapted to engage clutch discs 28 and 29 of the third speed clutch 27 to lock the clutch carrier 22 to the planet carrier 26.

Figure 1 shows the operation of the transmission in low or first speed ratio, during which the rotational speed of the clutch carrier is low enough so that the weights 48 are not substantially displaced and the valve sleeve 47 is so positioned in the valve 46 that there is no fluid communication between the conduits 44 and 45 and the conduits 50 and 51, respectively. Accordingly, neither the second speed clutch 23 nor the third speed clutch 27 are operated.

Under these conditions, rotation of the drive shaft 12 is imparted to the impeller housing 15 and transmitted by hydraulic reaction to the runner housing 19 and through the overrunning clutch 21 to the main shaft 13. The forward speed brake 37 is actuated, preventing, through the overrunning clutch 39, reverse rotation of the planet carrier 26. With the planet carrier thus locked against reverse rotation, torque is transmitted from the sun gear 35 on the main shaft 13 to the planet pinion 32 and then from planet pinion 33 to the sun gear 36 on the load shaft 14, at the maximum speed reduction. Inasmuch as the sun gear 34 on the clutch carrier 22 is in constant mesh with the planet pinion 31, the clutch carrier is rotated, but since both clutches 23 and 27 are disengaged there is no reaction, and the maximum engine torque is transmitted to the load shaft in the forward direction and at low or first speed ratio.

As the rotational speed of the clutch carrier 22 increases, radial displacement of the centrifugal weights 49 is effective to move the valve sleeve 47 and to establish fluid communication between the conduit 44 from the pump and the conduit 50 leading to the piston 54 of the second speed clutch, engaging the discs 24 and 25. The third speed clutch remains disengaged.

As seen in Figure 2, actuation of the second speed clutch 23 locks the drive shaft 12 and the impeller housing 15 to the clutch carrier 22. The carrier, in turn, drives its sun gear 34 and the triple planetary pinion through the pinion 31. The drive is again taken from the planet pinion 33 to its sun gear 36 on the load shaft 14. Inasmuch as the forward speed brake 37 is engaged, reverse rotation of the planet carrier 26 is prevented, so that forward rotation at an intermediate speed ratio is imparted to the load shaft. Although the main shaft 13 is rotated through pinion 32 and sun gear 35, the overrunning clutch 21 disconnects the runner housing 19 and permits the latter to rotate freely. The drive is therefore entirely mechanical and the fluid coupling is inoperative.

With a further increase in the rotational speed of the clutch carrier 22, the centrifugal weights 49 undergo further radial displacement, moving the valve sleeve 47 to a position such that fluid communication is established between the conduit 45 from the pump and the conduit 51 leading to the piston 55 of the third speed clutch 27. The valve 46 is so constructed that in this position of the valve sleeve, fluid communication is still maintained between conduits 44 and 50 and the second speed clutch remains engaged. Actuation of piston 55 is effective to engage the clutch discs 28 and 29 of the third speed clutch and to lock the clutch carrier 22 to the planet carrier 26. As illustrated in Figure 3, this results in the rotation as a unit of the clutch carrier, planet carrier, and the triple planetary pinion. Accordingly, a direct drive is established from the drive shaft 12 to the load shaft 14, thus transmitting torque at engine speed in the forward direction.

From the foregoing, it will be seen that the transition from first to second speed, and from second to third speed, is automatically effected as the speed of the vehicle increases. The mechanism is similarly automatically operative to effect a downward transition from third to second speed, and from second to first speed, as the speed of the vehicle decreases. Under certain conditions, however, additional acceleration is desired beyond that which can be obtained in the particular speed ratio at which the transmission is automatically operating due to the speed at that moment. For example, when the vehicle is operating on an incline or hill, in either second or third speed, a demand for additional acceleration often requires that the transmission be immediately shifted to a lower speed ratio. The present invention provides means whereby the transmission can be selectively shifted from third to second speed, or from second to first speed, by manual operation by the driver of either the accelerator controls or any other suitable control means.

Referring to Figure 4, the fluid pump is shown more in detail, and comprises a pump housing 56 carried within the rearward end of the transmission casing 57. Interposed in the pump housing 56 between the intake chamber 42 and the pressure chamber 43 is a pressure relief valve 58, for the purpose of preventing the pressure in chamber 43 from building up beyond a certain predetermined amount. The relief valve comprises a valve plunger 59 slidable within a cylindrical bore 61 in the pump housing 56. The plunger is normally urged by means of a coil spring 62 to a position abutting the Belleville washer 63 which closes one end of bore 61. In this position, the body of the valve plunger is effective to close communication between the pressure and intake chambers 43 and 42, respectively, of the pump.

Intermediate its end the valve plunger 59 has a section 64 of reduced diameter. A port 65 through the head of the valve plunger permits fluid under pressure to be transmitted from the pressure chamber 43 to the cavity between the end of the plunger and the Belleville washer 63. This pressure, acting upon the end of the valve plunger, is effective to move the latter against the action of the spring 62 and to enable communication to be established between the pressure chamber 43 and the intake chamber 42 through the annular groove 66 surrounding the reduced section 64 of the plunger, when the pressure in chamber 43 has increased to a certain predetermined amount. This temporarily short circuits the pump and maintains the pressure at the desired value.

A feature of the relief valve construction is the provision of means for preventing the building up of pressure in the transmission operating system when the engine is idling. This is accomplished by providing an idling port 67 in the pump housing 56 in such a position that it is in alignment with the reduced section 64 of the valve plunger when the latter is in its fully retracted position. The idling port 67 communicates with an annular groove 68 in the pump housing 56, the groove 68 being exhausted in a manner to be more fully described hereinafter. It will now be apparent that during idling the pressure chamber 43 of the pump is connected directly to exhaust through the idling port 67, preventing the building up of pressure in the pressure chamber and also in the transmission operating means connected to the pump.

As soon as the engine speed is increased above idling speed, the additional pressure in chamber 43 of the pump is effective to move the valve plunger 59 against the action of the spring 62 and to cover the idling port 67. Under normal operating conditions, the valve plunger remains in a position sufficiently advanced to close port 67 and prevent the exhausting of the pressure chamber 43 therethrough.

Figure 5:
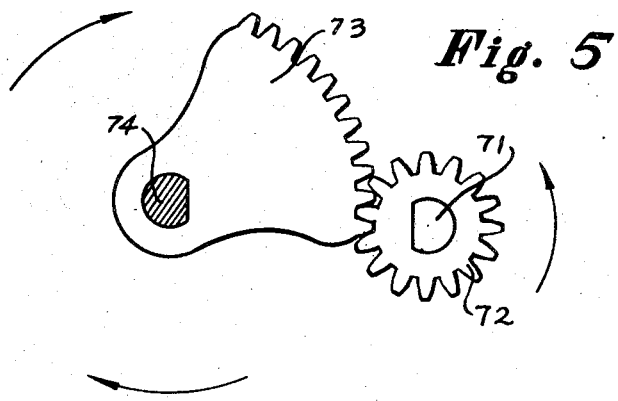
Figure 5 is an enlarged cross sectional view taken substantially on the line 5—5 of Figure 4.

The opposite side of the pump housing 56 is provided with a horizontal bore 69 within which is rotatably mounted a rotary accelerating valve 71. A pinion 72 is mounted upon one end of the valve, Figure 5, and meshes with the teeth on a quadrant or sector 73 carried at the inner end of the control rod 74 journaled in a boss 75 on the transmission casing. Two control arms 76 and 77 are rotatably mounted on the control rod 74 and are connected to the accelerator pedal and a manual control, respectively. A dog 78 is pinned to the control rod 74 and arranged so that independent movement of either control arm 76 or 77 will be transmitted to the control rod and effect a rotation of the rotary valve 71.

Reference is now made to Figure 4 and to Figures 6, 7 and 8, which show the rotary valve in the position it assumes when the accelerator pedal is released and the engine is idling. The valve 71 has an axial bore 79 with its open end closed by a disc 81. As best seen in Figure 6, the valve is formed with a diametrically extending passage 82 intersecting the axial bore 79. One end of passage 82 is bell-mouthed as at 83, and the opposite end opens into the peripheral groove 84. 85 is a pressure passage extending through the pump housing 56 from the pressure chamber 43 of the pump to the valve 71. In idling position, fluid pressure is transmitted from the pressure chamber 43 to the axial bore 79 of the valve through the pressure passage 85, peripheral groove 84, and passage 82.

Axially spaced from the peripheral groove 84 is an annular groove 86, Figure 7, arranged to communicate at all times with the axial bore 79 through a diametrically extending passage 87. Communicating with the annular groove 86 is a passage 88 formed in the pump housing, the passage 88 in turn being connected to conduit 45, Figure 1, leading to the third speed clutch 27.

Groove 84 extends a substantial and predetermined distance around the periphery of the valve, maintaining communication between ports 85 and 88, through the bore 79, throughout the normal range of the accelerator pedal, permitting normal operation of the vehicle in third speed.

Referring now to Figure 8, it will be seen that the valve is provided with a bell-mouthed radially extending passage 89 communicating with the axial bore 79, the passage 89 being axially spaced from the annular groove 86. In idling position, the radial passage 89 is blocked and closed by the interior wall of the bore 69. Angularly spaced from the radial passage 89 is a peripheral groove 91 which, in the idling position, establishes communication between passages 92 and 93, disposed at right angles to each other in the pump housing. Passage 92 forms an exhaust passage opening to the interior of the transmission casing 57 and passage 93 interconnects with the annular groove 68 which, as mentioned before, communicates with the idling port 67. When the engine is idling the pressure chamber 43 of the pump is thus exhausted through the idling port 67, annular groove 68, passage 93, peripheral groove 91 and exhaust passage 92.

It will be readily apparent that further depression of the accelerator pedal beyond its normal travel in third speed range will be effective to rotate the rotary valve 71 in a counterclockwise direction to the position shown in Figures 9, 10 and 11. In this position of the valve, the pressure passage 85 is completely closed by the valve and the flow of fluid under pressure from the pump through the various interconnecting passages to the third speed clutch is interrupted. As shown in Figure 10, communication between the valve bore 79 and the passage 88 leading to the third speed clutch is still open, but inasmuch as pressure passage 85 is closed, there is no fluid pressure in the bore 79. Cutting off the pressure to the third speed clutch renders the latter inoperative and release clutch carrier 22 from locking engagement with the planet carrier 26, resulting in shifting the transmission from third to second speed. Fluid remaining in the third speed cylinder 53 and the third speed conduits 45 and 51 is returned through passage 88, annular groove 86, and passage 87 to the axial bore 79 of the valve and is then exhausted, as seen in Figure 11, through radial passage 89 and the exhaust passage 92.

Thus, when the vehicle is operating in third speed and additional acceleration is desired, it is only necessary for the driver to depress the accelerator pedal beyond its normal operating stroke, or to operate the manual control arm 77, to effect an immediate shift from third to second speed, permitting the required acceleration.

Referring to Figures 12, 13 and 14, it will be seen that still further depression of the accelerator pedal is effective through pinion 72 and quadrant 73 to rotate the valve 71 in a counterclockwise direction to the position shown. In this position, the pressure passage 85 from the pressure chamber 43 of the pump again is open to communication with the axial bore 79 of the valve, the communication being through the bell-mouthed end 83 of the diametrically extending passage 82. Although communication is still open between the axial bore 79 and the passage 88 to the third speed clutch, Figure 13, it will be noted that in Figure 14 the axial bore 79 is also directly open to the exhaust passage 92 through the radial port 89.

This opening of the pressure chamber of the pump to the exhaust is effective, when the rotational speed of the pump is less than a predetermined amount, to reduce the pump pressure to such an amount that the second speed clutch 23 is disengaged. This permits an immediate transition from second to first speed to be effective by the driver in the event additional acceleration is desired beyond that which can be obtained in second speed under the then existing operating conditions. The additional movement of the accelerator pedal beyond the operation thereof necessary to effect a shift from third to second speed is resisted by spring loaded couplings of conventional type in the accelerator linkage, with the linkage arranged so that the spring loaded couplings must be compressed to secure the additional movement of the accelerator pedal. Figure 15 illustrates a coupling conventionally used in the linkage system between the accelerator pedal and the carburetor of the vehicle engine. The coupling comprises a pair of links 90 and 93 held together by a resilient connection so as to be normally non-extensible, yet adapted to be extended upon the application of sufficient tension. Link 90 has a ball shaped end 91 received within a sleeve 92 carried at the end of link 93. A coil spring 94 and washer 95 in the sleeve 92 normally hold the links in the relative position shown. The coupling however is yieldable under sufficient tension, so that the accelerator pedal can be moved beyond its normal range by the application of sufficient pressure. This additional pedal movement moves the rotary valve to a position enabling a downward shift to first speed to be made.

The various passages utilized in connecting the pressure chamber of the pump to the exhaust when the accelerator pedal is completely depressed are designed so that when the pump is operating above a predetermined rotational speed, the pressure generated thereby will be sufficient to actuate the second speed clutch even though the pressure chamber 43 is open to exhaust. With this arrangement a shift from second to first speed is impossible when the vehicle is traveling faster than a certain speed. This prevents inadvertent movement of the accelerator pedal to its completely depressed position from effecting a downward shift at high speed when such a reduction would be detrimental to the operation of the vehicle or might result in injury to various parts of the transmission. In addition, after a shift has been made from second to first speed by complete depression of the accelerator pedal—to obtain greater acceleration—a subsequent increase in vehicle speed will result in automatically shifting the transmission up to second speed, even though the accelerator pedal is maintained completely depressed. This follows since above certain speeds the pressure generated by the pump is adequate to operate the second speed clutch even though the pressure chamber may be still open to exhaust.

The rotary accelerating valve construction described above enables selective shifting from third to second speed, and from second to first speed, to obtain greater acceleration. Precision control is possible with this rotary valve construction, and a minimum of working parts are required.

Although we have shown and described certain embodiments of the invention, it will be understood that we do not wish to be limited to the exact construction shown and described but that various changes and modifications may be made without departing from the spirit and scope of our invention, as defined in the appended claims.

What we claim is:

1. In a variable speed power transmission for a vehicle engine having an accelerator, in combination, a housing, a power shaft, a load shaft, gearing interposed between said power shaft and said load shaft and arranged for selective operation to transmit torque from said power shaft to said load shaft at a plurality of different speed ratios, fluid pressure means arranged to effect said selective operation and automatically operable under predetermined conditions to change from one speed ratio to another, a fluid pump, a conduit from said pump to said fluid pressure means, a rotary valve controlling said conduit, said rotary valve having three angularly spaced operable positions, namely, a first position establishing communication through said conduit to connect said pump to said fluid pressure means, a second position interrupting the flow of fluid through said conduit, and a third position opening said conduit and said pump to exhaust, and means connecting said rotary valve to the accelerator to move said valve between said three positions.

2. In a variable speed power transmission for a vehicle engine having an accelerator, in combination, a housing, a power shaft, a load shaft, gearing interposed between said power shaft and said load shaft and arranged for selective operation to transmit torque from said power shaft to said load shaft at a plurality of different speed ratios, fluid pressure means arranged to effect said selective operation and automatically operable under predetermined conditions to change from one speed ratio to another, a fluid pump, a conduit from said pump to said fluid pressure means, and an accelerator actuated rotary valve controlling said conduit, said rotary valve having means closing said conduit upon angular movement by said accelerator and having passage means connecting said conduit and said pump to exhaust upon an additional angular movement.

3. In a variable speed power transmission, in combination, a housing, a power shaft, a load shaft, gearing interposed between said power shaft and said load shaft and arranged for selective operation to transmit torque from said power shaft to said load shaft at a plurality of different speed ratios, fluid pressure means arranged to effect said selective operation and automatically operable under predetermined conditions to change from one speed ratio to another, a fluid pump including a pressure chamber, a cylindrical bore and a pressure passage interconnecting said chamber and said bore, a conduit from said bore to said fluid pressure means, a rotary valve mounted in said bore, said valve having passage means normally establishing communication between said pressure passage and said conduit, means for rotating said valve to interrupt the flow of fluid from said pressure passage to said conduit, and additional passage means in said valve arranged upon a further angular movement of said valve to directly connect said pressure chamber of said pump to exhaust.

4. In a variable speed power transmission, in combination, a housing, a power shaft, a load shaft, gearing interposed between said power shaft and said load shaft and arranged for selective operation to transmit torque from said power shaft to said load shaft at a plurality of different speed ratios, fluid pressure means arranged to effect said selective operation and automatically operable under predetermined conditions to change from one speed ratio to another, a fluid pump including a pressure chamber, a cylindrical bore, a pressure passage interconnecting said chamber and said bore and an exhaust passage communicating with said bore, a conduit from said bore to said fluid pressure means, a rotary valve mounted in said bore, said valve having passage means normally establishing communication between said pressure passage and said conduit but arranged to be incapable of maintaining such communication after a predetermined angular movement of said rotary valve, said valve having additional passage means effective to establish communication between said pressure passage and said exhaust passage upon an additional angular movement of said valve, and externally operated means for rotating said valve.

5. In a variable speed transmission, in combination, a housing, a power shaft, a load shaft, a fluid coupling having one element fixed for rotation with said power shaft, a multiple planetary gearing system comprising a carrier and planet pinions and sun pinions having one element thereof fixed for rotation with said load shaft, a power transmitting member interposed between said fluid coupling and said planetary gearing system and arranged for selective operation therewith, means rendering said member inoperative with respect to said fluid coupling and said planetary gearing system and to transmit torque in one direction through said coupling and said planetary gearing system at one speed ratio, means to lock said member to said power shaft and said planetary gearing system to effect differential rotation thereof and transmit torque at another speed ratio in said one direction, means to lock said member to said power shaft and said planetary gearing system to effect common rotation therof and transmit torque at a third speed ratio in said one direction, means rendering said fluid coupling inoperative while torque is transmitted at said last two speed ratios, hydraulic means for operating said last two locking means, conduits leading to said hydraulic means, a pump supplying activating fluid under pressure to said conduits, and a rotary valve controlling one of said conduits and operable upon a predetermined angular movement to effect a change from one speed ratio to a lower speed ratio.

6. The structure of claim 5 which is further characterized in that said pump includes a pressure chamber, a cylindrical bore and a pressure passage interconnecting said chamber and said bore, said rotary valve being mounted in said bore and having passage means normally establishing communication between said pressure passage and said last mentioned conduit, and means for rotating said valve to interrupt the flow of fluid from said pressure passage to said conduit.

7. The structure of claim 5 which is further characterized in that said pump includes a pressure chamber, a cylindrical bore, a pressure passage interconnecting said chamber and said bore, and an exhaust passage communicating with said bore, said rotary valve being mounted in said bore and having passage means normally establishing communication between said pressure passage and said last mentioned conduit but arranged to be incapable of maintaining such communication after a predetermined angular movement of said rotary valve, said valve having additional passage means effective to establish communication between said pressure passage and said exhaust passage upon an additional angular movement of said valve, and externally operated means for rotating said valve.

8. The structure of claim 5 which is further characterized in that said pump includes a pressure chamber, a cylindrical bore, and three passages intersecting said bore in axially spaced planes, one of said passages leading to said pressure chamber, a second of said passages leading to said last mentioned conduit and the third passage opening to exhaust, said rotary valve being mounted in said bore and having passage means normally establishing communication between said first and second passages but arranged to be incapable of maintaining such communication after a predetermined angular movement of said valve, said valve having additional passage means effective to establish communication between said first and third passages upon an additional angular movement of said valve, and externally operated means for rotating said valve.

9. The structure of claim 5 which is further characterized in that said pump includes a pressure chamber, a cylindrical bore, and three passages intersecting said bore in axially spaced planes, one of said passages leading to said pressure chamber, a second of said passages leading to said last mentioned conduit and the third passage opening to exhaust, said rotary valve being mounted in said bore and having an axial bore closed at each end and three generally radial passages intersecting said last mentioned bore and axially spaced for alignment with the three passages in said pump, said radial passages being angularly arranged such that communication between said first and second passages is established in one angular position of said valve and interrupted in another angular position of the valve and such that communication is established between said first and third passages in a third angular position of said valve, and externally operated means for rotating said valve.

ROY F. WEEKS.
EUGENE J. FARKAS.

REFERENCES CITED

The following references are of record in the file of this patent:

UNITED STATES PATENTS

| Number | Name | Date |
| --- | --- | --- |
| 2,150,950 | Thoma | Mar. 21, 1939 |
| 2,229,345 | Schotz | Jan. 21, 1941 |
| 2,329,724 | Maurer | Sept. 21, 1943 |
| 2,352,212 | Lang | June 27, 1944 |

FOREIGN PATENTS

| Number | Country | Date |
| --- | --- | --- |
| 471,458 | Great Britain | Sept. 6, 1937 |
| 484,463 | Great Britain | May 2, 1938 |